United States Patent [19]

Hawk

[11] 4,045,050
[45] Aug. 30, 1977

[54] ARTICULATED VEHICLE TILT LIMITING APPARATUS

[75] Inventor: Dale Wyatt Hawk, Springfield, Ill.

[73] Assignee: Fiat-Allis Construction Machinery, Inc., Deerfield, Ill.

[21] Appl. No.: 749,318

[22] Filed: Dec. 10, 1976

[51] Int. Cl.² ............................................. B60D 7/02
[52] U.S. Cl. .................................. 280/492; 280/438 R
[58] Field of Search ............... 280/438 R, 438 A, 439, 280/440, 432, 423 R, 423 B, 400, 492; 180/134, 135, 136, 137, 138, 139

[56] References Cited

U.S. PATENT DOCUMENTS

| 1,990,731 | 2/1935 | Greer | 280/423 R |
| 2,187,970 | 1/1940 | Greer | 280/440 |
| 2,837,349 | 6/1958 | Hawk | 180/136 X |

Primary Examiner—Robert R. Song
Assistant Examiner—R. Schrecengost
Attorney, Agent, or Firm—Robert A. Brown; August E. Roehrig, Jr.; Harvey W. Rockwell

[57] ABSTRACT

Apparatus for limiting relative tilting between a tractor unit and a trailer unit of an articulated vehicle comprising a horizontal hitch pivot fixed to the tractor to permit relative tilting movement between the tractor and trailer units. A pair of right and left stationary stop members are each fixed to the tractor frame and spaced from the pivot device. Two pairs of movable upper and lower stop engaging members are fixedly connected to the horizontal pivot device to contact opposite sides of each stationary stop member to limit relative tilting movement between the tractor and trailer. During the relative tilting between the units, one of the movable upper stop engaging members contacts the upper surface of one of the stationary stop members and simultaneously therewith the opposite movable lower stop engaging members contacts the lower surface of the opposite stationary stop members to evenly distribute stresses exerted on the components when limiting the tilt between the tractor and trailer units.

5 Claims, 5 Drawing Figures

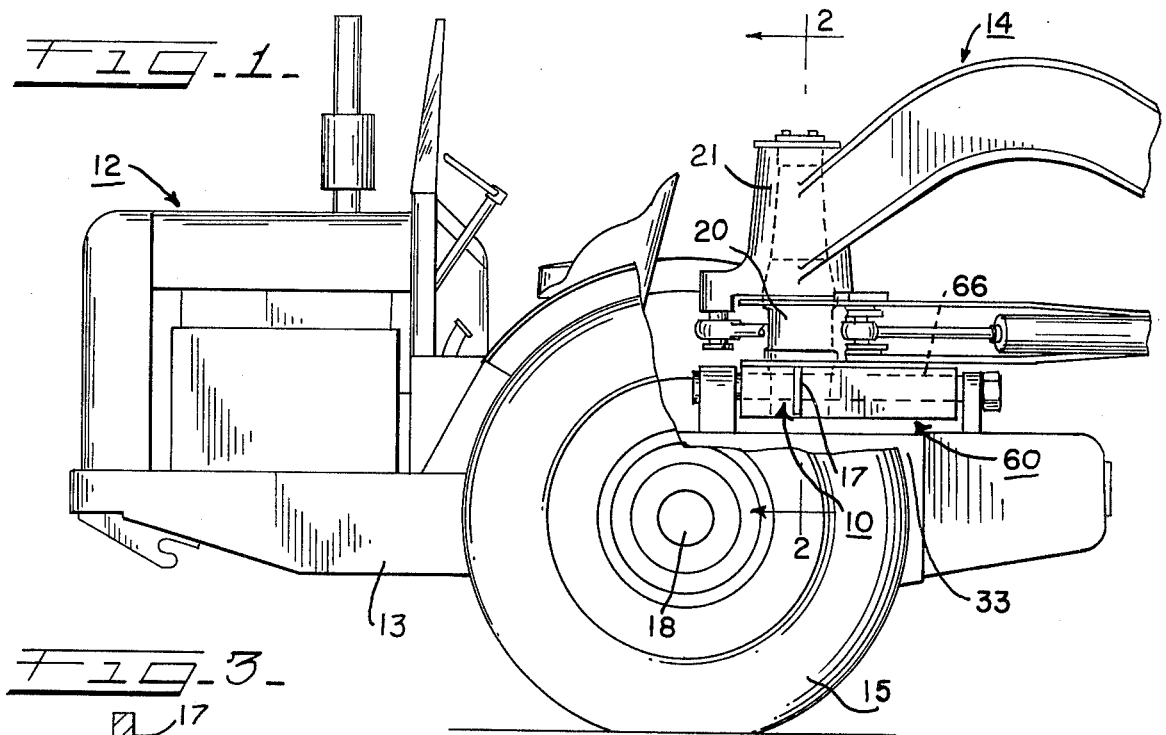

ARTICULATED VEHICLE TILT LIMITING APPARATUS

BACKGROUND OF THE INVENTION

This invention relates in general to articulated vehicle hitches and, in particular, to a tilt limiting apparatus for controlling the amount of tilt between units of the articulated vehicle.

More specifically, this invention relates to apparatus for limiting the amount of tilt between the tractor unit and the trailer unit of an articulated vehicle which will equalize stresses placed on the components when limiting the amount of tilt.

During operation of articulated vehicles, it is frequently necessary and desirable to allow the units forming the vehicle to tilt relative to each other to keep all of the vehicle wheels in ground contact when traveling over uneven surfaces to prevent the loss of tractive effort. However, the amount of tilting movement between the vehicles must be controlled to maintain vehicle stability. Various types and kinds of tilt control systems have been known in the art such as the use of an elongated rocker bar adapted to pivot about a horizontal axis when the trailer unit tilts relative to the tractor. Such a system is disclosed in U.S. Pat. No. 1,990,731 and utilizes two pairs of upper and lower fixed stop members positioned above and below the rocker bar at opposite ends thereof to limit the relative tilting between the tractor and trailer units. These stops include resilient elements normally contacting the upper and lower end portions of the rocker bar to cushion or reduce the impact incurred in stopping the relative tilting between the tractor and trailer unit. When the trailer tilts relative to the tractor, one end of the rocker bar compresses the resilient element of the lower stop on one side while the opposite end of the bar compresses a resilient element of the upper stop at the other side to cushion or reduce impact incurred when stopping the movement of the ends of the bar. While such mechanism may be suitable for some applications, the resilient elements wear out losing their elasticity and must be replaced by attaching new resilient elements in proper alignment with the stop engaging surfaces of the rocker bar. After repeated use the resilient stops wear unevenly and thus localized high stresses develop in the hitching apparatus.

SUMMARY OF THE INVENTION

It is, therefore, an object of this invention to improve tilt limiting apparatus for articulated vehicles.

Another object of this invention is to improve articulated vehicle limiting apparatus by eliminating the necessity for careful alignment of the stop members relative to a movable stop engaging member to minimize wear problems.

It is a further object of this invention to evenly distribute the stresses incurred during limitation of the relative tilting between units of an articulated vehicle.

These and other objects are attained in accordance with the present invention wherein there is provided an apparatus for limiting relative tilting between a tractor and trailer unit of an articulated vehicle which includes a horizontal hitch pivot fixed to the tractor unit to permit relative tilting movement between the tractor and trailer units. A pair of right and left stationary stop members are each secured to the tractor frame and spaced adjacent the pivot device. Two pairs of movable upper and lower stop engaging members are fixedly connected to the horizontal pivot device for movement into contact on opposite sides of each stop member to limit relative tilting movement between the tractor and trailer unit. During the relative tilting between the units, one of the upper stop engaging members contacts the upper surface of one of the stationary stop members and simultaneously therewith the opposite lower stop engaging member contacts the lower surface of the opposite stationary stop member to evenly distribute stess exerted on the components of the structure when limiting the tilt between the tractor and trailer units.

In one embodiment adjustably positionable rods are provided to enable the stop engaging surfaces to be conveniently aligned, and in another embodiment only one stationary stop member is required to be aligned with a movable stop engaging member.

DESCRIPTION OF THE DRAWINGS

Further objects of the invention, together with additional features contributing thereto and advantages accruing therefrom, will be apparent from the following description of two embodiments of the invention when read in conjunction with the accompanying drawings wherein:

FIG. 1 is a side elevational view of a portion of an articulated vehicle showing a tractor unit and the gooseneck portions of a trailer unit with a portion of the vehicle tire cut away to better illustrate the hitch construction;

FIG. 2 is an enlarged sectional view of the hitch shown in FIG. 1 taken along lines 2—2;

FIG. 3 is a cross sectional view of a portion of the hitch shown in FIG. 2 taken substantially along the lines 3—3;

DESCRIPTION OF PREFERRED EMBODIMENTS

Figures 4, 5:
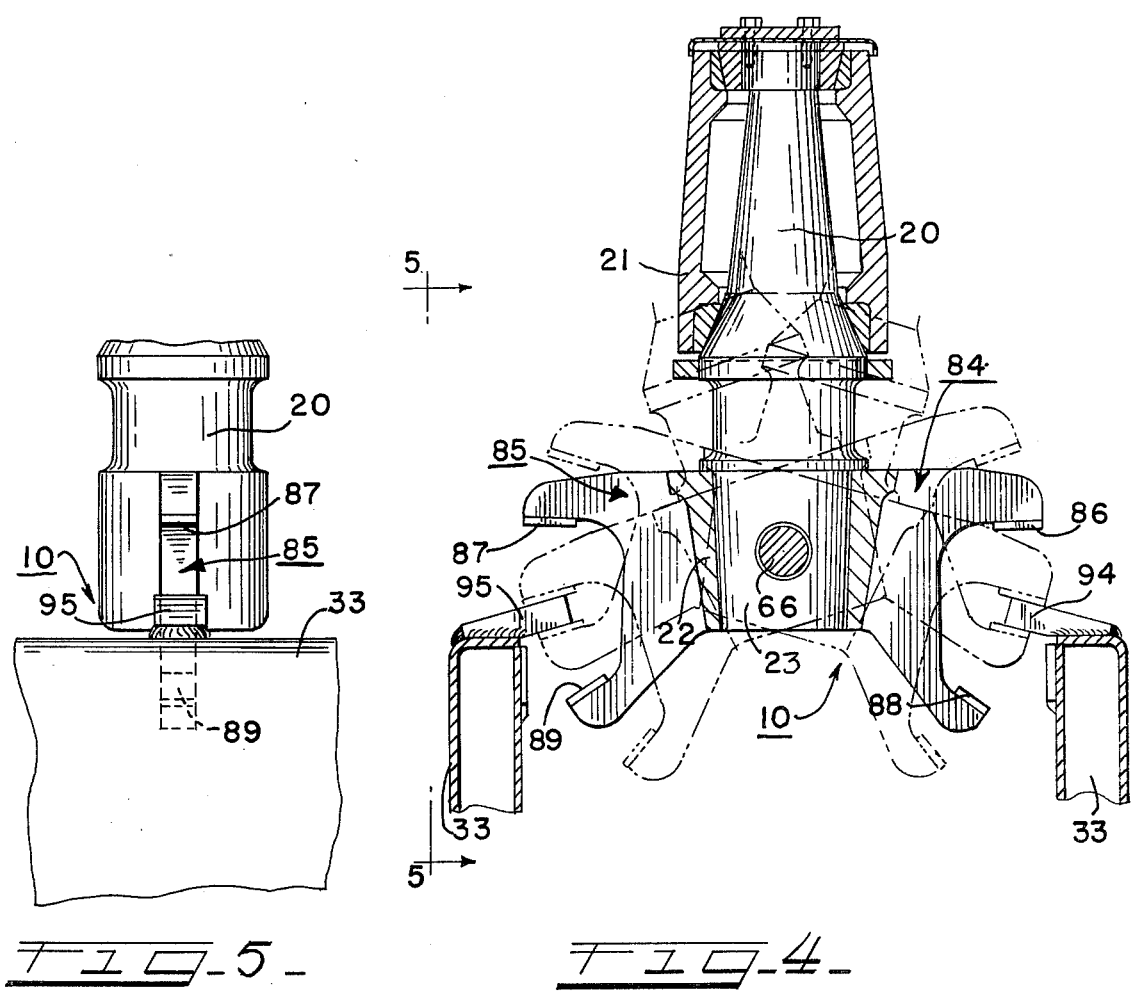
FIG. 4 is a view similar to that of FIG. 2 illustrating an alternative embodiment of the tilt limiting apparatus.
FIG. 5 is a side profile view of the hitch shown in FIG. 4 to better illustrate the tilt limiting structure.

Referring now to FIGS. 1, 2 and 3 of the drawings, there is shown one embodiment of a tilt limiting apparatus 10 constructed in accordance with the present invention. While it is to be understood that the invention may be utilized with different types of hitching apparatus for articulated vehicles, for convenience of illustration the invention has been described with reference to its use in the coupling hitch of an articulated vehicle of the type utilized in the construction equipment industry and commonly referred to as a wheeled scraper. The scraper comprises a two-wheel tractor unit 12 coupled to a trailer (not shown) by means of a draft connection 14 commonly referred to as a gooseneck. The tractor 12 includes a pair of transversely spaced ground engaging wheels 15 and a frame 13 in which a wheel axle 18 is journaled.

As best shown in FIG. 2 of the drawings the coupling hitch for joining the tractor and trailer units of the articulated vehicle generally comprises a vertical hitching shaft or king pin 20 carried by the tractor unit 12 for engagement by a housing 21 formed at the forward portion of the gooseneck 14 to allow the draft or tractor unit 12 to pivot relative to the trailer unit about the vertical axis of the coupling formed by the housing 21 secured to the vertical hitch shaft 20. The vertical hitch shaft or king pin 20 includes a hollow, horizontal base portion 23 which is centrally apertured to receive a horizontal hitch pin 66 extending within a horizontal hitch pin assembly generally indicated at 60 of FIG. 1 of the drawings. The coupling of the vertical hitching shaft or king pin relative to the hitch pin 66 enables the draft or tractor unit and trailer unit to tilt relative to each other about the horizontal axis of the hitch pin 66. For further details relating to such a coupling reference is had to U.S. Pat. No. 2,837,349 the disclosure of which is herein incorporated by reference.

While as previously discussed it is necessary to enable the units of the articulated vehicle to tilt relative to each other to maintain tractive effort when traveling over uneven surfaces, in order to maintain vehicle stability the amount of tilt must be controlled. The tilt limiting apparatus 10 generally comprises right and left stop plates 16 and 17 which extend horizontally and radially outward from a horizontal portion 22 of the king pin 20. Right and left stop engaging surfaces 24 and 25 of the stop plates 16 and 17, respectively, are formed on the underside of opposite ends of the stop plates to engage right or left stop blocks 28 and 31, respectively, which are fixed to a portion 33 of the tractor frame 13.

In order to equalize or more evenly distribute the forces imposed on the units during limiting of the tilting between the two units a pair of auxiliary stop engaging discs 36 and 37 are fixed to the respective lower ends of a pair of rods 38 and 39 which are pivotally connected at their upper ends to the stop plates 16 and 17 respectively. The rods 38 and 39 extend through holes 42 and 43 formed in a pair of auxiliary stop blocks 46 and 47, respectively, also secured to the portion 33 of the tractor frame.

In operation when either of the tractor or trailer units tilts relative to the other unit, the horizontal hitching shaft or king pin 20 will pivot about the central axis on the horizontal hitch pin 66 due to the coupling between the housing portion 21 of the gooseneck 14 and the vertical hitch shaft or king pin 20. Assuming for purposes of illustration that the trailer tilts to the right as viewed in FIG. 2 of the drawings, the king pin 20 rotates about the horizontal axis of the horizontal hitch pin 66 thereby rotating the stop plates 16 and 17. As the king pin 20 continues to rotate to the right the stop engaging surface 24 of the stop plate 16 moves downwardly into engagement with the stop block 28 to limit further rotation. At the same time, the stop plate 17 moves upwardly moving auxiliary stop disc 37 into engagement with the bottom side of the left auxiliary stop block 47.

The tilt limiting apparatus 10 is readily adjustable as described in greater detail below such that the stop engaging surface 24 of the stop plate 16 contacts the stop block 28 at the same time the auxiliary stop disc 37 engages the underside of the auxiliary stop block 47. Such simultaneous contact thereby evenly distributes the stresses acting upon the hitching apparatus to prevent all of the stresses from being incurred by one side of the tractor frame.

The adjustability of the auxiliary stop discs and stop block arrangement will be described in detail with reference to the left hand auxiliary system only as the right hand system is substantially the same. The auxiliary stop disc 37 is connected to the stop plate 17 by means of a clevis end 71 of the rod 39 connected to the stop plate 17 by means of pivot pin 73. A pair of flange brackets 75 and 77 are fixed to the portion 33 of the tractor frame for supporting the auxiliary stop block 47. The upper end of the rod 39 is threaded into the clevis 71 so that the distance between the auxiliary stop disc 37 and the auxiliary stop block 47 may be varied. As a result, the stop engaging disc 37 may be adjusted to engage the auxiliary stop block 47 at the same time the stop engaging surface 24 of the stop plate 16 engages the right stationary stop block 28 as illustrated by the broken lines 80 in FIG. 2 of the drawings.

Similarly, when the relative tilting between the tractor and trailer units occurs in the opposite direction, as indicated by the broken lines 90 of FIG. 2 of the drawings, the upper left stop engaging surface 25 of stop plate 17 will contact the left stationary stop block 31 at the same time the lower right auxiliary stop disc 36 contacts the right auxiliary stop block 46.

Referring now to the embodiment of the invention disclosed in FIGS. 4 and 5, the tilt limiting apparatus 10 includes a king pin 20 supported about a horizontal hitching pin 66 in the same manner as the embodiment disclosed in FIGS. 1, 2 and 3. A pair of right and left stop plates 84 and 85, respectively, extend laterally from the king pin 20. The end portion of the stop plates 84 and 85 are C-shaped with the distal ends of the C terminating in upper or lower flanges, or stop engaging surfaces, adjacent right and left stationary stop blocks 94 and 95, respectively. Upper and lower flanges of stop plate 84 are designated 86 and 88 respectively, and upper and lower flanges of stop plate 85 are designated 87 and 89, respectively.

Each of the stationary stop blocks 94 and 95 is secured to the portion 33 of the tractor frame 13 in the manner previously described with reference to FIGS. 1, 2 and 3, with the stationary stop blocks positioned between the movable C-shaped ends of the stop plates 84 and 85.

When the tractor and trailer unit tilt relative to one another as indicated by the broken lines shown in FIG. 5, the upper stop engaging surfaces of one of the stop plates will simultaneously contact the topside of the adjacent stationary stop member while the lower stop engaging surface of the opposed stop plate contacts the underside of the opposite stationary stop member. Therefore, the stresses incurred during tilt limiting operation are uniformly distributed between the structural components of both sides. Since the stationary stop engaging members 94 and 95 project upwardly at a slight angle relative to the horizontal surface of the frame portion 33, only the stationary stop members need to be positioned relative to the stop engaging surfaces of the stop plate to effect simultaneous contact of opposed ends of opposite stop plates.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated by the inventor for carrying out this invention, but that the invention will include all embodiments falling within the scope of the appended claims.

What is claimed is:

1. Apparatus for use in limiting relative tilt between a tractor unit and a trailer unit of an articulated vehicle comprising pivot means operatively connected to a tractor unit and a trailer unit of an articulated vehicle for enabling said units to tilt relative to each other about a horizontal axis, a stop engaging member carried by said pivot means and extending transversely of said horizontal axis with the distal ends thereof positioned to engage first stop members carried on one of said units upon a predetermined amount of tilt between said units, first stop members carried on one of said units in a position to be mutually exclusively engaged by one of the distal ends of said stop engaging member upon said predetermined amount of tilt between said units, said stop engaging member having a pivotally connected stop engaging element depending from each end thereof in a position to engage a second stop member carried by one of said units upon said predetermined amount of tilt between said units, and second stop members carried on one of said units in a position to simultaneously and mutually exclusively engage one of said pivotally connected stop engaging elements depending from an end of said stop engaging member when the other end engages one of said first stop members.

2. The apparatus of claim 1 wherein said pivotally connected stop engaging elements are adjustable relative to said second stop members for facilitating simultaneous engagement of said first and second stop members.

3. The apparatus of claim 1 wherein said pivotally connected stop engaging element comprises a clevis pivotally connected to said stop engaging member between an end thereof and the horizontal axis, a threaded rod having a stop disc secured to one end thereof with the opposite end extending through one of said second stop members into said clevis.

4. Apparatus for use in limiting relative tilt between a tractor unit and a trailer unit of an articulated vehicle comprising pivot means operatively connected to a tractor unit and a trailer unit of an articulated vehicle for enabling said units to tilt relative to each other about a horizontal axis, a stop engaging member carried by said pivot means and extending transversely of said horizontal axis with C-shaped distal ends positioned to engage a stop member carried on one of said units upon a predetermined amount of tilt between said units, stop members having an upper and lower engaging surface carried on one of said units adjacent to the distal ends of said stop engaging member and in a position to engage said distal ends of said stop engaging member upon said predetermined amount of tilt between said units, said stop members being positioned for simultaneous engagement of the upper portion of one of said C-shaped distal ends of said stop engaging member with the upper engaging surface of one of said stop members and the lower portion of the opposite C-shaped distal end with the lower engaging surface of the adjacent stop member to distribute stresses when limiting tilt between said units.

5. The apparatus of claim 4 wherein the C-shaped distal ends of said stop engaging member include flanges for engaging said stop members.

* * * * *